United States Patent
Lisso et al.

(10) Patent No.: US 11,104,517 B2
(45) Date of Patent: Aug. 31, 2021

(54) ORDER PICKING USING MOBILE ROBOTS ON ELEVATED PATHWAYS

(71) Applicant: Target Brands, Inc., Minneapolis, MN (US)

(72) Inventors: Gregory Lisso, Minneapolis, MN (US); Gervasio Mutarelli, Minneapolis, MN (US); Thomas Gardner, Minneapolis, MN (US); Poojesh Wagle, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 218 days.

(21) Appl. No.: 16/534,181

(22) Filed: Aug. 7, 2019

(65) Prior Publication Data

US 2021/0039886 A1 Feb. 11, 2021

(51) Int. Cl.
B65G 1/137 (2006.01)
(52) U.S. Cl.
CPC .................................. B65G 1/1375 (2013.01)
(58) Field of Classification Search
CPC ................................................... B65G 1/1375
See application file for complete search history.

(56) References Cited

U.S. PATENT DOCUMENTS

| | | | |
|---|---|---|---|
| 7,780,392 B2 | 8/2010 | Rogers | |
| 2012/0330458 A1* | 12/2012 | Weiss | B66F 9/063 700/216 |
| 2016/0355337 A1 | 12/2016 | Williams | |
| 2018/0065807 A1* | 3/2018 | Lert, Jr. | B65G 1/0492 |
| 2019/0152703 A1* | 5/2019 | Sellner | B65G 1/1378 |

OTHER PUBLICATIONS

Alibaba Group [online], "New 'Robotic Restaurant' fromFreshippo (Hema)," Jun. 26, 2018, [retrieved on Aug. 7, 2019], retrieved from: URL<https://www.youtube.com/watch?v=fcqGnZqQJCQ>, 1 page (Video Submission).
Banker, [online], "New Robotic Solutions For The Warehouse," Mar. 7, 2017, [retrieved on Aug. 7, 2019], retrieved from: URL<https://www.forbes.com/sites/stevebanker/2017/03/07/new-robotic-solutions-for-the-warehouse/#25eac2646506>, 3 pages.

(Continued)

*Primary Examiner* — Kyle O Logan
(74) *Attorney, Agent, or Firm* — Fish & Richardson P.C.

(57) ABSTRACT

Robotic automation and methods described herein can be used to enhance the efficiencies of order fulfillment and inventory stowage processes. For example, this document describes the integration of elevated pathways that are dedicated for mobile robots to use in conjunction with a human-operated order picker lift to transport items for order fulfillment processes in an efficient manner. In some embodiments, the elevated pathways for the mobile robots can be at least partially integrated into storage systems such as pallet racking. The described systems and methods allow the elimination of human labor particularly related to transporting saleable goods and similar items. Mobile robots take over many of the tasks related to transporting the picked items. Accordingly, the efficiency of the human order picker, as measured by the number of line items picked per hour for example, is greatly enhanced.

20 Claims, 6 Drawing Sheets

(56) References Cited

OTHER PUBLICATIONS

CBS Boston [online], "Robot Designed In Mass. Boosts Warehouse Productivity," Nov. 19, 2018, [retrieved on Aug. 7, 2019], retrieved from: URL<https://www.youtube.com/watch?v=I_ZR4fQC0jE>, 1 page (Video Submission).
Invata Intralogistics, [online], "Optimizing Omni-Channel Fulfillment," 2019, [retrieved on Aug. 7, 2019], retrieved from: URL<https://www.invata.com/omni-channel-fulfillment/>, 24 pages.
Tompkins International [online], "Tompkins Robotics Presents t-Sort," Mar. 9, 2018, [retrieved on Aug. 7, 2019], retrieved from: URL<https://www.youtube.com/watch?v=EbLDXsEPHS8>, 1 page (Video Submission).

* cited by examiner

ORDER PICKING USING MOBILE ROBOTS ON ELEVATED PATHWAYS

This document relates to systems and methods for enhancing the efficiencies of order fulfillment and inventory stowage processes. For example, this document relates to the integration of elevated pathways dedicated for mobile robots to use in conjunction with other material handling systems to efficiently pick and transport items for order fulfillment processes.

BACKGROUND

The ability to efficiently and accurately process customer orders has become an essential part of doing business. In many order-picking processes, items are stored in fixed locations on static shelving or pallet racks. A human order picker operates a forklift or other type of warehouse vehicle to pick one order at a time following a route up and down each aisle of a warehouse until all the items corresponding to the entire order are picked. The order picker usually uses some type of picking cart (e.g., cage, bin, case, etc.) to hold the items that are picked. The picking cart is then transported on the order picker by the human order picker to the next station (e.g., packaging, the shipping dock, sortation engine, etc.).

This basic order picking method can work relatively well in operations having a small total number of orders and a high number of items/picks per order. Operations with lower items/picks per order will find the travel time excessive in this type of picking method, and operations with large numbers of orders will find that the congestion from many pickers working in the same areas slows down the processing of orders.

In general, rack picking is one of the most labor intensive and expensive operations in many warehouse operations. Productivity gains in the form of reducing the travel time are greatly desirable.

SUMMARY

This document describes systems and methods for enhancing the efficiencies of order fulfillment and inventory stowage processes. For example, this document describes the integration of elevated pathways dedicated for mobile robots to use in conjunction with other material handling systems (e.g., human-operated order pickers) to efficiently pick and transport items for order fulfillment processes. In some embodiments, the elevated pathways for the mobile robots can be at least partially integrated into storage systems, such as pallet racking.

In one aspect, this disclosure is directed to material handling system. In some embodiments, the system includes: (i) a rack storage system in a warehouse; (ii) an elevated pathway at least partially integrated into the rack storage system at a level of elevation above a floor of the warehouse, wherein the elevated pathway comprises two lanes for mobile robots; (iii) a first mobile robot configured to transport a cargo holder on the elevated pathway; and (iv) a second mobile robot configured to transport the cargo holder on the elevated pathway.

Such a material handling system may optionally include one or more of the following features. In some embodiments, one of the two lanes is a parking lane defining a plurality of mobile robot parking spots. At least one of the plurality of mobile robot parking spots may be associated with each aisle in the warehouse. In some embodiments, one of the two lanes is a transport lane configured to allow the first and second mobile robots to travel along the elevated pathway. The first mobile robot may be configured to: (a) move into a first mobile robot parking spot in the parking lane; (b) receive a first cargo holder from an order picker in the first mobile robot parking spot in the parking lane; (c) move, in response to receiving the first cargo holder from the order picker, into the transport lane of the elevated pathway; and (d) transport the first cargo holder to one or more remote locations in the warehouse via the transport lane of the elevated pathway. In some embodiments, the elevated pathway is at least partially integrated into an end of the rack storage system. The elevated pathway may include a third lane for mobile robots. The third lane may be another transport lane configured to allow the first and second mobile robots to travel along the elevated pathway. In some embodiments, the elevated pathway is at least partially integrated into a middle of the rack storage system. The elevated pathway may include three lanes for mobile robots. Two of the three lanes may be parking lanes on opposing sides of the elevated pathway and one of the three lanes may be a first transport lane positioned between the parking lanes. In some embodiments, the elevated pathway also includes a fourth lane for mobile robots defining a second transport lane. The second transport lane may be positioned between the parking lanes. The system may also include one or more elevated pathways at least partially integrated into the rack storage system at multiple levels of elevation above the floor of the warehouse.

Such a material handling system may optionally include one or more of the additional following features. In some embodiments, the second mobile robot is configured to move into a second mobile robot parking spot in the parking lane with a second cargo holder, such that the second cargo holder can be transferred to the order picker for picking. The second cargo holder may be filled with items for stowing and the second mobile robot may be configured to: (1) move into the second mobile robot parking spot in the parking lane with the second cargo holder, such that the second cargo holder can be transferred to the order picker for stowing and then picking; (2) receive, from the order picker, the second cargo holder that is filled with items from picking by the order picker; (3) move, in response to receiving the second cargo holder from the order picker, into the transport lane of the elevated pathway; and (4) transport the second cargo holder to one or more remote locations in the warehouse via the transport lane of the elevated pathway. In some embodiments, the cargo holder is a cage. Alternatively, in some embodiments the cargo holder is a pallet. In some embodiments, the cargo holder remains on a mobile robot that is parked in a mobile robot parking spot in the parking lane of the elevated pathway while an order picker transports items from one or more storage locations in the rack storage system to the cargo holder on the mobile robot.

In another aspect, this disclosure is directed to a method of material handling. The method may include: (i) controlling a first mobile robot to park in a first mobile robot parking spot in a parking lane of an elevated pathway that is integrated into a rack storage system at a level of elevation above a floor of a warehouse, the first mobile robot being configured to receive a first cargo holder from an order picker, wherein the first cargo holder is configured for receiving items being picked from storage; (ii) controlling a second mobile robot to park in a second mobile robot parking spot in the parking lane of the elevated pathway, wherein the second mobile robot is transporting a second cargo holder; (iii) controlling, after receiving the first cargo holder from the order picker, the first mobile robot to move into a transport lane of the elevated pathway; and (iv) controlling the first mobile robot to transport the first cargo holder received from the order picker to one or more remote locations in the warehouse via the transport lane of the elevated pathway.

Such a method may optionally include one or more of the following features. The method may also include controlling the second mobile robot to move from the second mobile robot parking spot into the first mobile robot parking spot such that the second cargo holder can be transferred to the order picker. The method may also include controlling the second mobile robot to park in the first mobile robot parking spot. The second mobile robot may be configured to receive the second cargo holder from the order picker. The second cargo holder may be configured for receiving items being picked from storage. The method may also include controlling a third mobile robot to park in the second mobile robot parking spot in the parking lane of the elevated pathway, wherein the third mobile robot is transporting a third cargo holder. The method may also include controlling, after receiving the first cargo holder from the order picker, the second mobile robot to move into the transport lane of the elevated pathway. In some embodiments, the method may also include controlling the second mobile robot to transport the second cargo holder received from the order picker to one or more remote locations in the warehouse via the transport lane of the elevated pathway. The method may also include controlling the third mobile robot to move from the second mobile robot parking spot into the first mobile robot parking spot such that the third cargo holder can be transferred to the order picker.

In another aspect, this disclosure is directed to a method of picking ordered items and stowing replenishment items. The method may include: a) transferring, by a worker operating an order picker, one or more first ordered items from first storage locations and putting the one or more first ordered items in or on a first cargo holder that is engaged with the order picker; b) transferring, from the order picker to a first mobile robot that is parked in a first mobile robot parking spot in a parking lane of an elevated pathway that is integrated into a rack storage system at a level of elevation above a floor of a warehouse, the first cargo holder with the one or more first ordered items in or on it such that the first mobile robot can move into a transport lane of the elevated pathway and transport the first cargo holder with the one or more first ordered items in or on it to one or more remote locations in the warehouse; c) after the transferring of the first cargo holder with the one or more first ordered items in or on it to the first mobile robot, transferring, from a second mobile robot that is parked in a second mobile robot parking spot in the parking lane of the elevated pathway, a second cargo holder with one or more replenishment items in or on it such that the second cargo holder with the one or more replenishment items in or on it becomes engaged with the order picker; d) transferring, by the worker operating the order picker, the one or more replenishment items from the second cargo holder that is engaged with the order picker into storage locations; and e) after the transferring of the one or more replenishment items into the storage locations, transferring, by the worker operating the order picker, one or more second ordered items from second storage locations and putting the one or more second ordered items in or on the second cargo holder that is engaged with the order picker.

Such a method may optionally include one or more of the following features. In some embodiments, the method also includes transferring, from the order picker to the second mobile robot, the second cargo holder with the one or more second ordered items in or on it such that the second mobile robot can move into the transport lane of the elevated pathway and transport the second cargo holder with the one or more second ordered items in or on it to one or more remote locations in the warehouse.

The systems and processes described here may be used to provide one or more of the following optional benefits. First, labor costs associated with order fulfillment processes may be reduced by using the automated systems and processes described herein. For example, the systems and processes described herein can function largely autonomously or semi-autonomously, thereby reducing the need for human involvement in the process of transporting items that are picked from inventory and/or that need to be stowed in inventory. The lessened human involvement advantageously translates to lower operating costs.

Second, the lessened human involvement has an additional benefit of increasing the amount of time that a human picker can spend picking items in a designated aisle, rather than spending additional time transporting picked items and/or cages (e.g., cases, bins, etc.) of items to other locations in the warehouse. In other words, the human picker would not have to pick items for a single load then drive that load to a designated location in the warehouse. Rather, the human picker can work in a single aisle or compact zone and remain fully engaged in productive work of picking and/or placing items. This would improve productivity, throughput, labor costs, cycle times, and utilization of capital assets.

Third, the use of automation systems such as mobile robots as described herein can accelerate the speed of order fulfillment processes. Such reductions in cycle time for order fulfillment in some cases can facilitate quicker delivery of ordered items to customers, stores, and the like. Accordingly, customer satisfaction can be increased, and inventory-carrying costs can be decreased.

Fourth, quality can be improved through automation so as to reduce potential human error in the order fulfillment process. Robotic systems, such as mobile robots described herein, can be configured to deliver items (e.g., cargo, bins of picked orders, empty bins) to multiple granular downstream process points. Humans are statistically prone to a higher level of error than automation processes, so by focusing humans on picking items in designated aisles, potential human error in determining and delivering picked items to other locations (e.g., downstream process points) can be reduced.

Fifth, the system described throughout this disclosure can be used to intelligently route inventory for placement in target storage locations throughout the warehouse. In other words, inventory can be delivered to a desired aisle for storage or further processing without potential human error. This can improve quality control, increase the speed of stowing inventory, improve inventory availability for picking by human pickers, and improve overall order processing.

Sixth, implementing the system described throughout this disclosure can result in improved safety conditions of the warehouse. Traditional autonomous mobile robots travel and operate in adjacent space to humans, human-operated warehouse vehicles (e.g., forklift, high-bay order picker), and other autonomous or semi-autonomous warehouse vehicles, which increases the risk of collision and/or traffic. Much effort, time, and resources are spent on safety systems to make these robots safer to operate collaboratively with humans and other human-operated equipment or warehouse vehicles. Consequently, the elevated pathways system described herein can fix autonomous mobile robots in a non-collaborative environment, lower costs, and reduce the possibility of collisions, traffic, or other risks associated with movement on the warehouse floor.

Seventh, the use of elevated pathways integrated into storage systems such as racking as described herein can result in an increased storage density of a warehouse. The elevated pathways can be integrated into storage systems without hindering storage of items below and/or above the elevated pathways, and while allowing such storage. This is in contrast, for example, to a conventional conveyor system that separate from racking. In such a system there is typically no storage above or below the conveyor. Accordingly, the elevated pathways that are integrated into storage systems as described herein better utilize the vertical height of a warehouse, resulting in greater storage density.

Eighth, the systems and methods described herein can be utilized for item sortation (in addition to purely for transportation). This is possible because the use of mobile robots for transporting goods can efficiently facilitate transportation of singular items or a small quantity of items (i.e., more efficiently than if human operated material handling equipment was used). Accordingly, the systems and methods described herein can be leveraged for item sorting with more granularity than conventional systems and methods. Moreover, the small size of mobile robots as compared to human operated material handling equipment can enable mobile robots to travel to locations, or along routes, that are unattainable by human operated material handling equipment.

Ninth, another advantage of the systems described herein is that the elevated pathways can be installed within the storage systems without causing major disruptions and/or downtime of the warehouse operations. In other words, the systems described herein are readily "retrofittable" into existing warehouse operations in a time and cost-efficient manner.

Other features, aspects, and potential advantages will be apparent from the accompanying description and figures.

DESCRIPTION OF DRAWINGS

Like reference symbols in the various drawings indicate like elements

DETAILED DESCRIPTION

Figure 1:
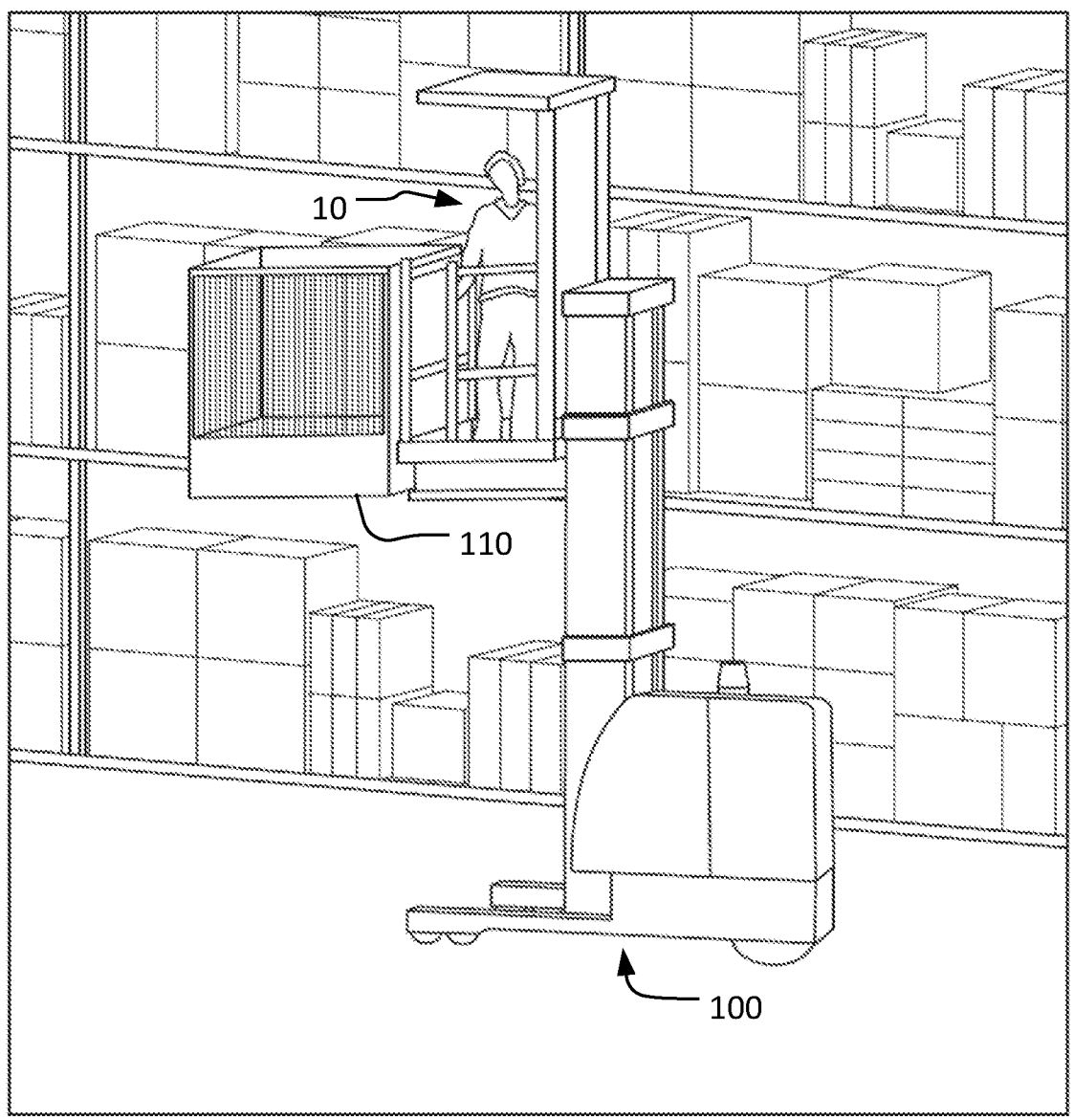
FIG. 1 illustrates a human worker who is operating an order picker to transfer items from storage racking into an order picker cage in an example order picking scenario.

This document describes systems and methods for enhancing the efficiencies of order fulfillment and inventory stowage processes. For example, this document describes the integration of elevated pathways dedicated for mobile robots to use in conjunction with a human-operated order picker to pick and transport items for order fulfillment processes in an efficient manner. In some embodiments, the elevated pathways for the mobile robots are at least partially integrated into a storage system, such as pallet racking or other types of storage systems.

The systems and methods described herein can greatly reduce and/or eliminate the amount of time that a human worker spends transporting items that the human worker was assigned to pick. As described below, mobile robots can take over many of the tasks related to transporting the picked items. Accordingly, the efficiency of the human worker that is picking orders, as measured by the number of items picked per hour, for example, is greatly improved.

In some embodiments, this innovation is directed to order fulfillment systems and methods using autonomous or semi-autonomous mobile robots in conjunction with human-operated order picker lifts (e.g., high-bay order picker) or other warehouse vehicles. The mobile robots can travel on one or more elevated pathways that are dedicated for use by the mobile robots. In some embodiments, the elevated pathways are at least partially integrated into a storage system (e.g., racks) that items are stored in. The human worker can pick items from storage locations in the storage system and place the picked items in a cargo holder or other type of receptacle (e.g., order picker cage, pallet, bin, cart, tote, box, etc.) that is engaged with the order picker (e.g., high-bay order picker) being operated by the human worker. When the time comes to transport the receptacle that is holding the picked items to another (e.g., remote) location in the warehouse, such as an order sorting area, packaging area, shipping area, and the like, the receptacle is transferred from the order picker to a mobile robot waiting to receive the receptacle on the elevated pathway. Then, the mobile robot can transport, on the elevated pathway, the receptacle holding the picked items to the one or more designated locations in the warehouse. During the time that the mobile robot is transporting the receptacle and items, the human worker can resume order picking using the order picker. Accordingly, the human-operated order picker spends more time picking items and less time, if any, transporting items. The efficiency of the overall system is better than if the human-operated order picker is also tasked with transporting picked items to the one or more designated locations in the warehouse for subsequent handling/processing.

In some embodiments, a first empty mobile robot is physically near the human-operated order picker and ready to receive the receptacle holding the picked items. In addition, a second mobile robot transporting an empty receptacle can be nearby on the elevated pathway and waiting to transfer the empty receptacle to the human-operated order picker. After transferring the empty receptacle to the order picker, the second mobile robot can assume the duties of the first mobile robot, i.e., standing by the human-operated order picker and awaiting to receive the receptacle holding picked items. This arrangement maximizes the percentage of time that the human-operated order picker spends actually picking items from warehouse storage locations, rather than transporting picked items around the warehouse. Hence, the systems described herein make for more efficient use of human labor.

Referring to FIG. 1, a human worker 10 is depicted as operating an order picker 100 in a warehouse to execute an order picking process. To execute such an order picking process, the worker 10 transfers one or more ordered items from the warehouse shelving or pallet rack in a storage system to a cargo holder 110 that is engaged with the order picker 100. In this depicted example, the cargo holder is an order picker cage 110. In some embodiments, the order picker cage 110 includes casters so that the order picker cage 110 can be rolled around like a cart. In other examples, the cargo holder 110 can be a bin, pallet, crate, or other type of receptacle for holding items.

Typically, an order management system provides instructions to the worker 10 regarding what item(s) to pick, and the inventory locations from which to pick the item(s). The picked items may be for the fulfillment of an ecommerce order, store replenishment order, inventory transfer order, or any other type of order or inventory transfer instruction. The worker 10 generally picks one order at a time from storage, following a route up and down each aisle of the warehouse until the entire order is picked (or until the order picker cage 110 is full). The order picking instructions will typically list the items to be picked in the same sequence that the items are located along the picking flow path. During the picking process, the worker 10 will sometimes use a bar-code scanner to wand-in a bar code of the items to confirm those items have been picked and put into the order picker cage 110.

When all of the items of the order have been picked/transferred into the order picker cage 110, or when the order picker cage 110 is full, conventionally the worker 10 will drive the order picker 100 to another area of the warehouse to drop off the order picker cage 110. Next, the worker 10 will drive the order picker 100 to pick up an empty order picker cage 110. Then, the worker 10 will drive the order picker 100 that is engaged with the empty order picker cage 110 back to the storage system (e.g., racks) of a particular aisle to begin the picking process for another order.

Based upon the teachings herein, one of skill in the art will readily understand that, in order to execute this conventional manual order picking process described above, the worker 10 spends an excessive amount of time traveling within the warehouse. That time spent traveling may be considered essentially unproductive time for the worker 10. As described in more detail below, some embodiments described herein provide a solution in which the worker 10 can spend a greater proportion of time actually picking items, rather than transporting picked items and empty cargo holders throughout the warehouse. Moreover, operations with large numbers of orders will find that the congestion from many pickers working in the same areas slows down the processing.

Figure 2:
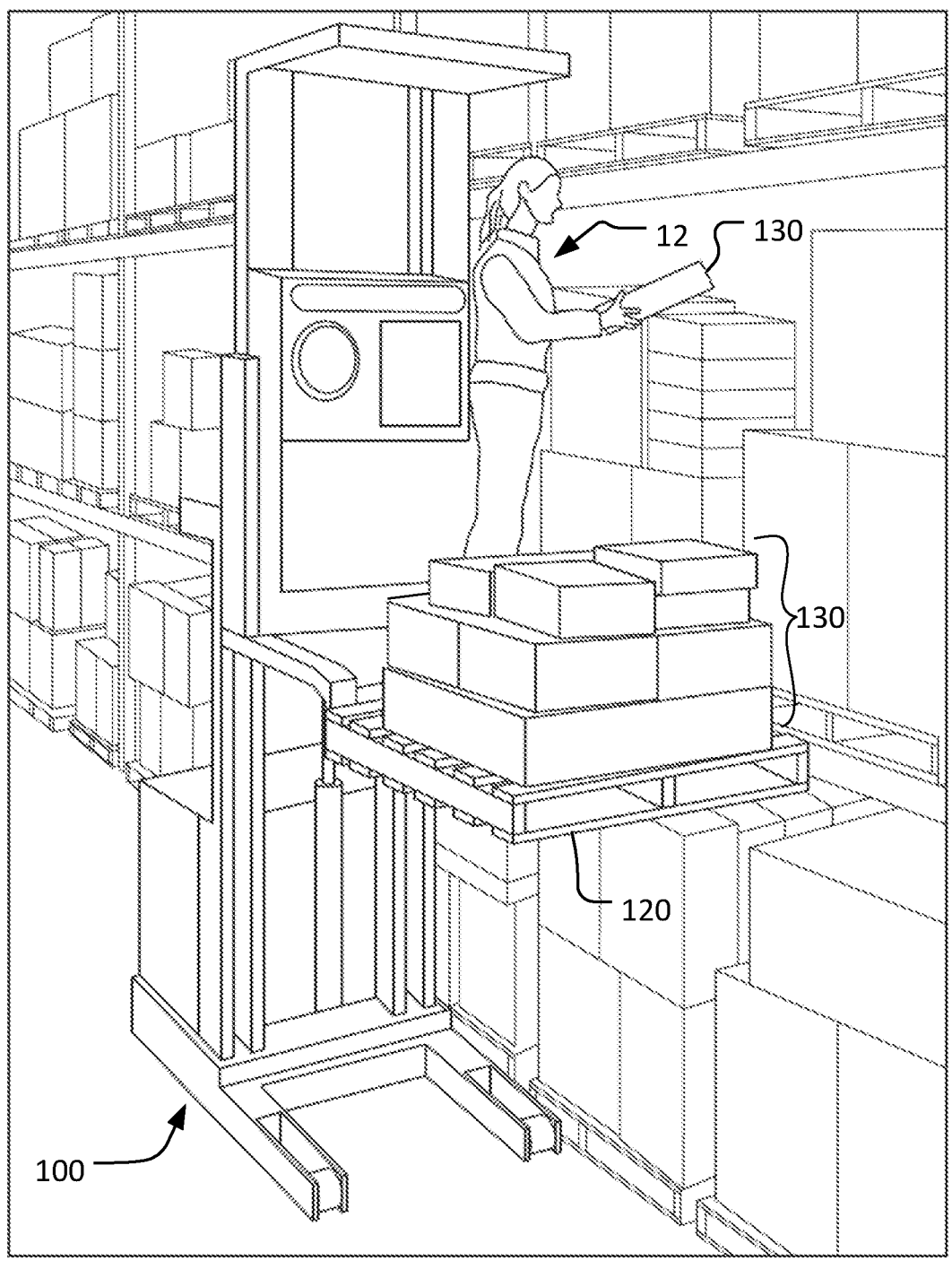
FIG. 2 illustrates a human worker who is operating an order picker to transfer items from a pallet that is engaged with the order picker into pallet storage racking in an example item stowing scenario.

Referring to FIG. 2, a human worker 12 is depicted as operating an order picker 100 in a warehouse to execute an inventory replenishment stowing process. To execute such an inventory replenishment stowing process, the worker 10 transfers one or more replenishment items 130 from a cargo holder 120 that is engaged with the order picker 100 to the warehouse shelving or pallet racks. In this depicted example, the cargo holder 120 is pallet 120. In other examples, the cargo holder 120 can be a cage, bin, crate, or other type of receptacle for holding items. Such an inventory replenishment stowing process is essentially the reverse of an order picking process.

In a conventional inventory replenishment stowing process, when all of the items 130 from the cargo holder 120 have been transferred by the worker 12 to the shelving/racks, the worker 12 will then drive the order picker 100 with the empty cargo holder 120 to drop off the empty cargo holder 120 in a designated location of the warehouse. Next, the worker will drive the order picker 100 to pick up another cargo holder 120 that contains more items to be stowed in the storage rack system of any particular aisle in the warehouse. Then, the worker 10 will drive the order picker 100 that is engaged with the full cargo holder 120 back to a designated storage rack system in a particular aisle to begin the stowing process for the items on/in the cargo holder 120.

Based upon the teachings herein, one of skill in the art will readily understand that, in order to execute the conventional inventory replenishment stowing process described above, the worker 10 may spend an excessive amount of time traveling within the warehouse, which is essentially unproductive time for the worker 10. As described in more detail below, some embodiments described herein provide a solution in which the worker 10 can spend a greater proportion of time actually stowing items in/on the shelving/racks, rather than transporting the empty and/or full cargo holders 120 to different locations throughout the warehouse.

Figure 3:
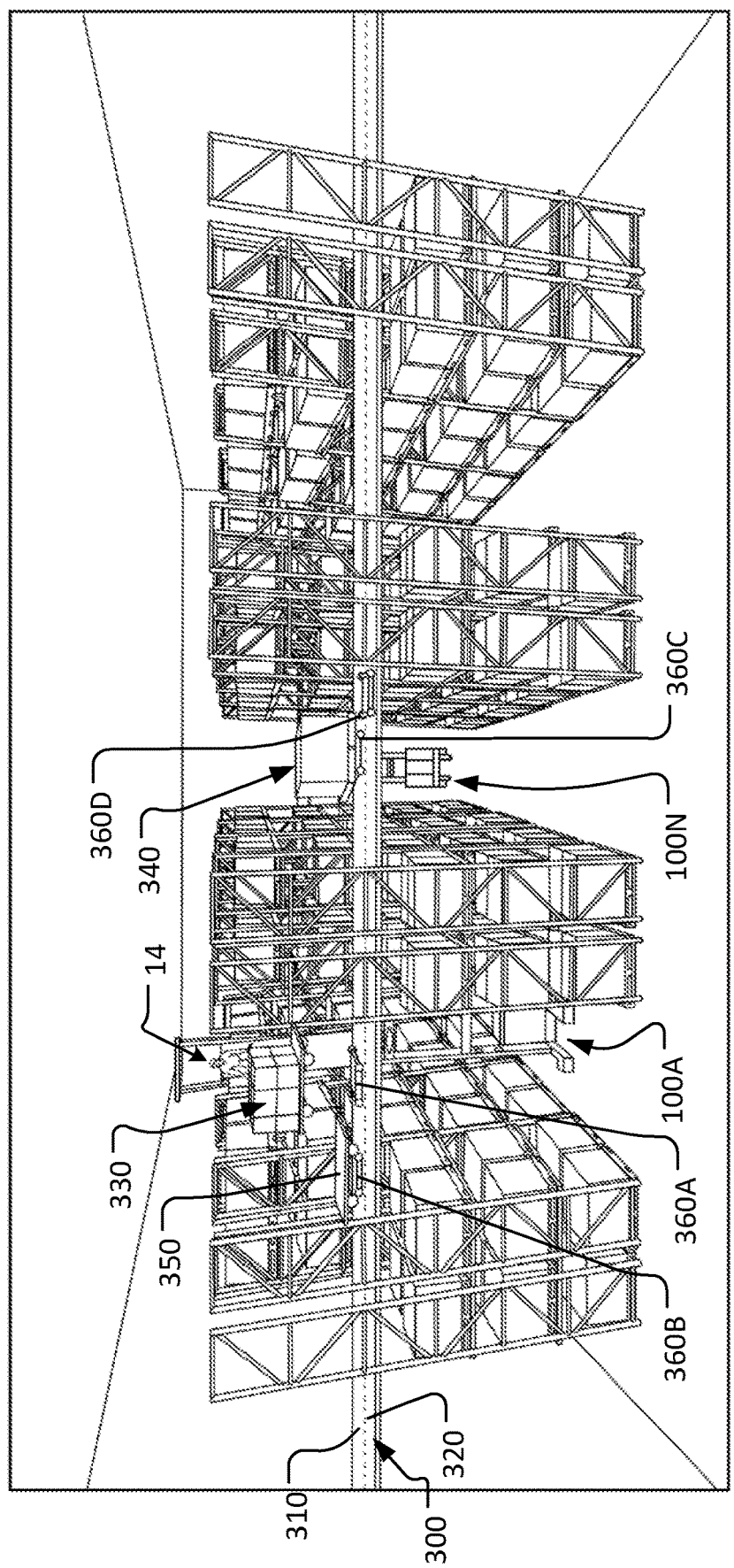
FIG. 3 illustrates a similar scenario as FIG. 1, with the addition of an elevated pathway for mobile robots to transport items around a warehouse.

FIG. 3 illustrates the same operative scenario as FIG. 1, but with the innovative addition of an elevated pathway 300 on which mobile robots can transport items around the warehouse. In the depicted scenarios, a first mobile robot 360A is waiting in a parking lane 310 of the elevated pathway 300 to receive a filled order picker cage 330 (or pallet) from the human-operated high-bay order picker 100A. While mobile robots are used herein to describe the systems and methods, it should be understood that other types of vehicles can be used instead of, or in addition to, the mobile robots. For example, in some embodiments automated guided vehicles ("AGVs") can be used instead of, or in addition to, the mobile robots.

In FIG. 3 it is apparent that the elevated pathway 300 is integrated directly into the warehouse racking. For example, in some embodiments the elevated pathway 300 is integrated into a single pallet space from each row of racking. This type of installation is efficiently "constructable" because the warehouse, for the most part, can continue operating while the elevated pathway 300 is installed directly into the warehouse racking as shown, for example.

A second mobile robot 360C is waiting in the parking lane 310 of the elevated pathway 300 with a bin 340 of items that are staged for stowage by a second order picker 100N. In the depicted example of FIG. 3, the order picker 100N is a forklift 100N. The order picker 100N can also be any other type of autonomous, semi-autonomous, or human-operated warehouse vehicle.

In some embodiments, the elevated pathway 300 can include the parking lane 310 and a transport lane 320. The parking lane 310 can further include one or more mobile robot parking spots. In some examples, each aisle in the warehouse can have one or more mobile robot parking spots associated therewith. In the depicted example in FIG. 3, two mobile robot parking spots are associated with the aisle that the order picker 100A is working in. Also in this depicted example in FIG. 3, one mobile robot parking spot is associated with the aisle that the order picker 100N is working in.

Mobile robots, such as a mobile robot 360D, can be configured to autonomously travel in the transport lane 320 under the control of a fleet management system and/or warehouse management system. The mobile robots can be controlled to enter and stop at a mobile robot parking spot of the parking lane 310 for a particular aisle in response to control commands from the fleet management system and/or warehouse management system (or other system). In some examples, where an aisle has two associated mobile robot parking spots, one mobile robot parking spot can be designated for a mobile robot carrying an empty receptacle (e.g., pallet 350, order picker cage, bin, etc.) to be used for picking items within the aisle. A second parking spot can be designated for a mobile robot carrying a filled receptacle, such as the bin 340, which needs to be stowed in the particular aisle. In other examples, a parking spot can be designated for a mobile robot that is not carrying anything, such as mobile robots 360A and/or 360D, but will pick up a receptacle (e.g., bin, pallet, order picker cage, etc.) that is currently being filled and/or emptied by a human worker 14 at the order picker 100A or the order picker 100N.

Still referring to FIG. 3, the worker 14 can operate the order picker 100A to transfer the filled order picker cage 330 to the first mobile robot 360A when appropriate (e.g., when all of the items for the order have been put into the order picker cage 330, when the order picker cage 330 is full, etc.). When the order picker cage 330 is ready to be transported to one or more other locations in the warehouse, the order picker cage 330 can be transferred from the order picker 100A to the first mobile robot 360A that is parked in the first mobile robot parking spot in the parking lane 310 of the elevated pathway 300.

Once the first mobile robot 360A has the order picker cage 330, the first mobile robot 360A will automatically transport the order picker cage 330 to one or more other locations in the warehouse by moving from the parking lane 310 into the transport lane 320 of the elevated pathway 300, as described further below. The first mobile robot 360A can take the transport lane 320 to one or more other locations in the warehouse without having to stop behind or navigate around mobile robots that are parked and/or waiting to receive and/or deliver receptacles, such as order picker cages 330, bins (e.g., bin 340), or pallets (e.g., pallet 350). This system advantageously reduces transport time of items throughout the warehouse and further improves human efficiency in picking and/or stowing inventory in a designated aisle.

While the first mobile robot 360A is transporting the order picker cage 330, the worker 14 can go back to the job of picking items for the next order, for example. Accordingly, the worker 14 operating the order picker 100A will not be tied up as the order picker cage 330 is transported, and the productivity of the worker 14 (e.g., as measured in number of items picked per hour) will be significantly improved (as compared to if the worker 14 transported the order picker cage 330 after filling the order picker cage 330 with picked items). In some embodiments, the worker 14 can pick items and put them in a second order picker cage 330 that is delivered to the worker 14 by the first mobile robot 360A before the first mobile robot 360A received the order picker cage 330 that the worker 14 was filling with items. In other embodiments, the worker 14 can pick items and put them in a second order picker cage 330 that is delivered to the worker 14 by another mobile robot (such as mobile robot 360B) that pulls up into the second parking spot in the parking lane 310 of the elevated pathway 300.

For example, still referring to FIG. 3, a third mobile robot 360B can park in the second parking spot in the parking lane 310 of the elevated pathway 320, behind the first mobile robot 360A. The third mobile robot 360B is carrying the pallet 350 and is waiting for the worker 14 operating the order picker 100A to complete the task(s) involving the filled order picker cage 330 and the first mobile robot 360A.

Moreover, in this example, the second mobile robot 360C is waiting while carrying the bin 340. The bin 340 can contain one or more items that need to be stowed in a storage system in the particular aisle that the order picker 100N is operating in. In this example, the second mobile robot 360C is waiting for the order picker 100N to retrieve the bin 340 from the second mobile robot 360C and stow the bin 340 and/or items contained in the bin 340 in the particular aisle.

A fourth mobile robot 360D is also moving along the transport lane 320 of the elevated pathway 300. The fourth mobile robot 360D can be tasked with moving along the transport lane 320 until it is assigned a task associated with a particular aisle or other location in the warehouse. In another example, the fourth mobile robot 360D can already be assigned a task associated with a particular aisle or other location in the warehouse and is therefore on its way to the particular aisle or other location to complete the assigned task.

Figure 4:
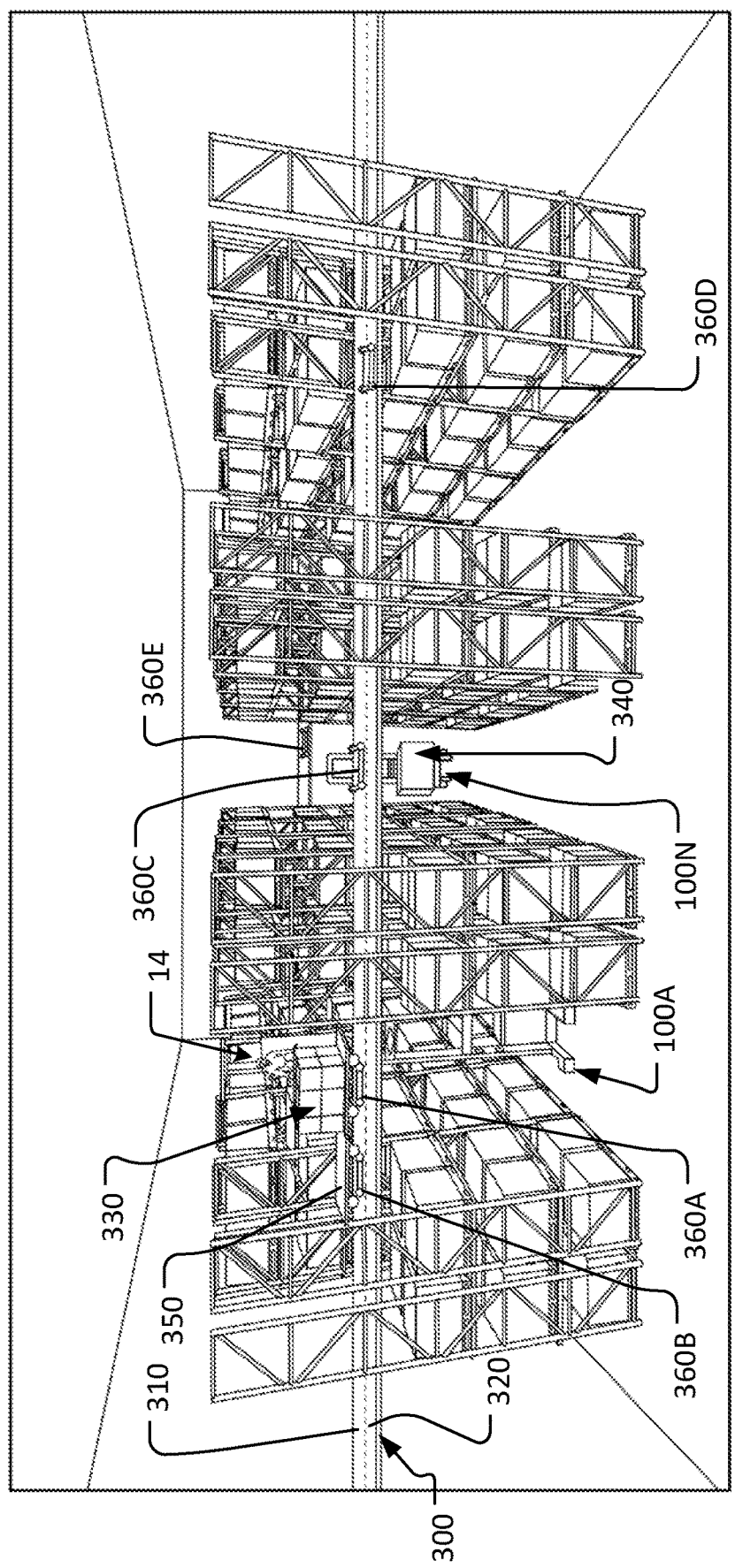
FIG. 4 illustrates the system of FIG. 3, including the placement of a filled order picker cage from a high-bay order picker onto a first mobile robot in the elevated pathway.

FIG. 4, illustrates placement of the filled order picker cage 330 from the high-bay order picker 100A onto the first mobile robot 360A. In this example, the filled order picker cage 330 is being lowered onto the first mobile robot 360A in the first parking spot by the worker 14 operating the order picker 100A. The third mobile robot 360B is waiting in the second parking spot in the parking lane 310 of the elevated pathway 300 in this illustration. As previously mentioned, the third mobile robot 360B is waiting to transfer the empty pallet 350 to the order picker 100A. As a result, the worker 14 would not have to travel to another location in the warehouse to retrieve the empty pallet 350 to then load the pallet with picked items. The worker 14 can then spend more time picking (transferring items from storage rack/shelves in the particular aisle to the pallet 350) and/or stowing (transferring items from an order picker cage to storage rack/shelves in the particular aisle). As previously mentioned, the third mobile robot 360B can also transport any other type of receptacle (e.g., order picker cage, crate, bin, etc.) to the order picker 100A instead of the pallet 350.

Still referring to FIG. 4, once forks of the order picker 100A disengage with the order picker cage 330, the first mobile robot 360A can pull away and move into the transport lane 320 of the elevated pathway 300. The first mobile robot 360A can then begin to transport the order picker cage 330 to one or more other locations within the warehouse by using the transport lane 320. The one or more other locations can include shipping, packaging, sortation, attribute collection, another storage location, etc.

In some embodiments, when the first mobile robot 360A moves into the transport lane 320 with the filled order picker cage 330, the third mobile robot 360B can move up into the first parking spot in the parking lane 310. That way, the order picker 100A does not need to move from its position in front of the first parking spot in order to pick up an the empty pallet 350 depicted in FIG. 4. As a result, the order picker 100A can immediately start its task of picking items in the designated aisle and placing them on the pallet 350. Once forks of the order picker 100A engage with the pallet 350, the third mobile robot 360B can wait in the first parking spot in the parking lane 310 until the worker 14 at the order picker 100A is done picking items and placing the items on the pallet 350. Once the worker 14 is done picking the items, the order picker 100A can transfer the filled pallet 350 to the third mobile robot 360B, as previously described. In yet other embodiments, a fourth mobile robot, such as the fourth mobile robot 360D depicted in FIG. 4, can pull up into the second parking spot in the parking lane 310 with an empty receptacle (e.g., order picker cage, bin, pallet, etc.) and wait for that receptacle to be engaged with the order picker 100A and then filled with picked items.

FIG. 4 further illustrates the items for stowage/storage in the bin 340 being stowed by the order picker 100N (e.g., forklift or other autonomous, human-operated, or semi-autonomous warehouse vehicle). The second mobile robot 360C is waiting in the first parking spot associated with the particular aisle in the parking lane 310 of the elevated pathway 300. In some embodiments, the order picker 100N is a human-operated fork truck or high-bay order picker. In some embodiments, the order picker 100N can be autonomous or semi-autonomous and configured by a warehouse management system or other system to transport the bin 340 and/or particular items in the bin 340 to storage locations in the particular aisle. For example, the order picker 100N can be tasked with storing the entire bin 340 in any level shelf/rack in the particular aisle.

In some examples, the second mobile robot 360C can wait in the first mobile robot parking spot associated with the particular aisle until the order picker 100N returns to the elevated pathway 300. Then, the second mobile robot 360C can receive one or more items and/or bins from the order picker 100N and transport those items and/or bins to remote locations throughout the warehouse. In other examples, the second mobile robot 360C can leave the parking lane 310 after the bin 340 is retrieved by the order picker 100N. Then, the second mobile robot 360 can be assigned to pick up items from another aisle and/or to travel along the transport lane 320 of the elevated pathway 300 until assigned another task by the warehouse management system or other system.

Still referring to FIG. 4, the fourth mobile robot 360D is still traveling along the transport lane 320 of the elevated pathway 300. In addition, in this example, a fifth mobile robot 360E is moving along the transport lane 320 of the elevated pathway 300 on an opposite end of the storage rack system.

In some examples, a storage rack system can include multiple elevated mobile robot pathways. For example, an elevated pathway can be at least partially integrated into each end of a storage rack system, as depicted in FIGS. 3-6. In other examples, elevated pathways can be at least partially integrated into a single end of the storage rack system. Each elevated pathway can be located at a different level of the storage rack system. For example, one elevated pathway can be integrated into a highest level in the storage rack system and a second elevated pathway can be integrated into a lower level in the storage rack system. The second elevated pathway can be integrated into the lower level where it would not interfere with movement or traffic of high-bay order pickers or other warehouse vehicles that are moving on the floor of the warehouse. In yet other examples, an elevated pathway can be integrated into a middle or any other portion of the storage rack system.

Figure 5:
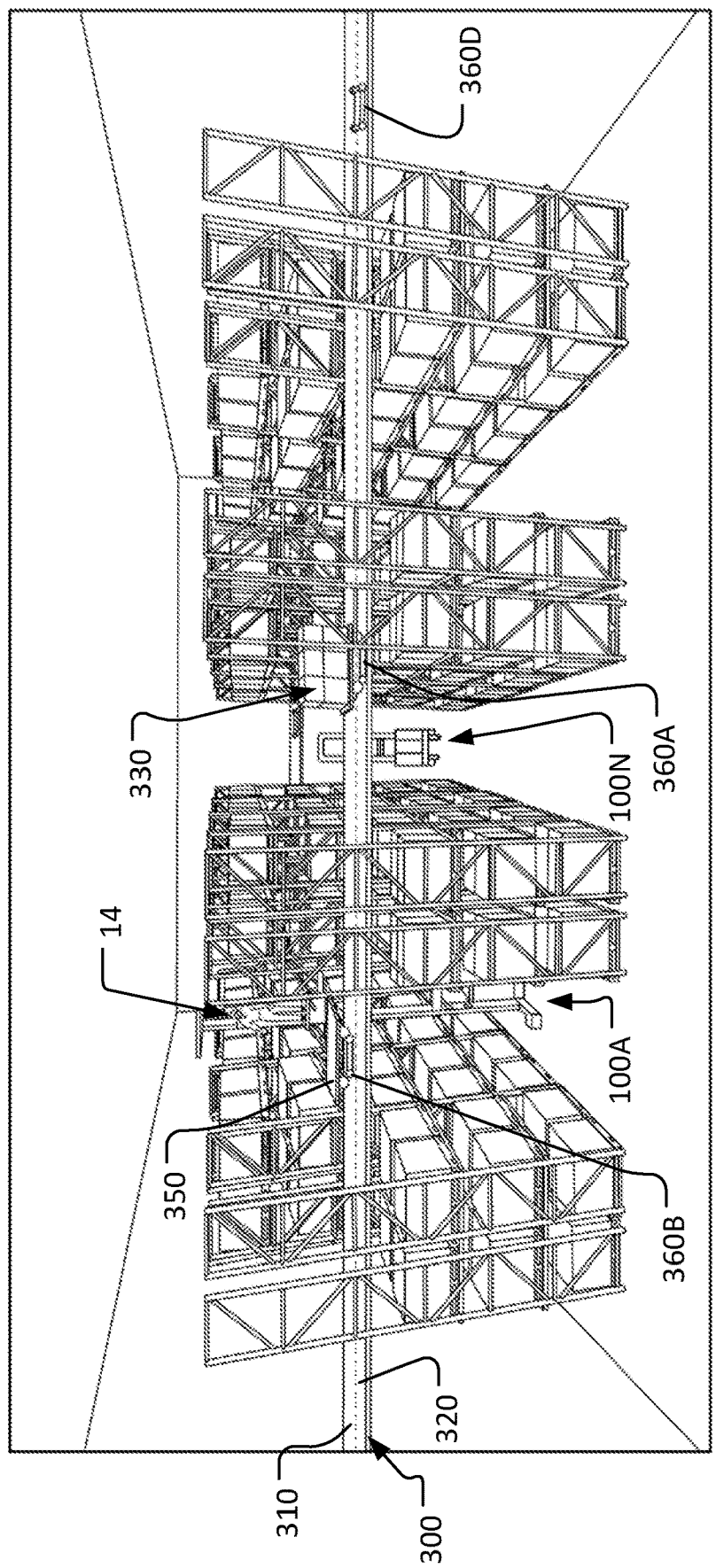
FIG. 5 illustrates the system of FIG. 3, with the first mobile robot in the process of transporting the filled order picker cage on the elevated pathway and another mobile robot waiting for an empty pallet to be received by the high-bay order picker.

FIG. 5 illustrates the first mobile robot 360A in the process of transporting the filled order picker cage 330 in the transport lane 320 of the elevated pathway 300. The fourth mobile robot 360D is also in the process of moving along the transport lane 320. The third mobile robot 360B carrying the pallet 350 has moved from the second mobile robot parking spot to the first mobile robot parking spot associated with the particular aisle in the parking lane 310. As a result, the worker 14 can control the order picker 100A to pick up the pallet 350 (e.g., engage the forks of the order picker 100A with the pallet 350). The worker 14 can then pick items from within the particular aisle and place them on the pallet 350. The worker 14 can also place entire bins and/or other large items from within the particular aisle on the pallet 350. Moreover, still referring to FIG. 5, the order picker 100N has finished stowing items (refer to FIG. 4) and may then perform other/additional tasks in the particular aisle or any other aisle or location in the warehouse.

Figure 6:
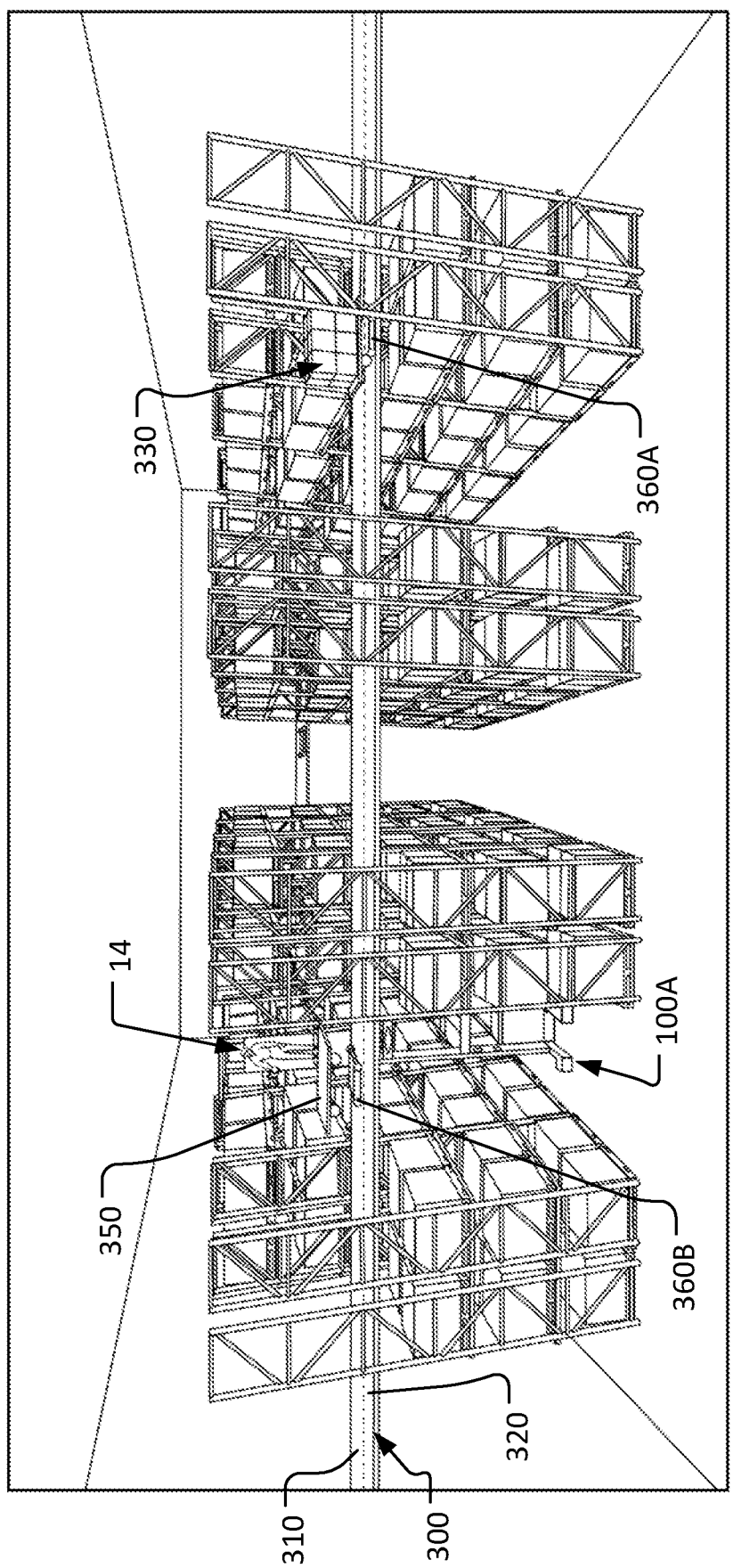
FIG. 6 illustrates the system of FIG. 3, with the high-bay order picker interacting with the empty pallet on the other mobile robot.

FIG. 6 illustrates the order picker 100A picking up the pallet 350 from the third mobile robot 360B. In some examples, as discussed throughout this disclosure, the order picker 100A can pick up other types of storage items, bins, receptacles, and/or cages from the third mobile robot 360B. In the example depicted in FIG. 6, the empty pallet 350 has been transferred from the third mobile robot 360B to the order picker 100A. The third mobile robot 360B can then remain waiting in the first parking spot associated with the particular aisle in the parking lane 310. The third mobile robot 360B can stand by to receive the pallet 350 once the appropriate time comes (e.g., when an entire order has been picked, when the pallet 350 is filled with items from the particular aisle, etc.). Said another way, after transferring the empty pallet 350 to the order picker 100A, the third mobile robot 360B can take on the role that was previously played by the first mobile robot 360A in the context of FIG. 3 (waiting in the first parking spot to receive a cargo holder that is holding items that then need to be transported elsewhere in the warehouse). In other embodiments, the third mobile robot 360B can move out of the parking lane 310 and into the transport lane 320 of the elevated pathway 300. The third mobile robot 360B can be configured to move into the transport lane 320 if it is called to another aisle to pick up a different receptacle or if it is assigned any other task in any location throughout the warehouse.

As described above, while the third mobile robot 360B is waiting to receive the pallet 350, a sixth mobile robot that is carrying an empty receptacle can move from the transport lane 320 into the second parking spot associated with the particular aisle in the parking lane 310, behind the third mobile robot 360B. The sixth mobile robot carrying the empty receptacle would take on the role that was previously played by the third mobile robot 360B in the context of FIG. 4. Accordingly, it should be understood that the process of always having at least two mobile robots in one or more parking spots in the parking lane 310 can be cyclical and ongoing (where one of the two mobile robots is ready to receive a cargo holder (e.g., receptacle, bin, crate, cage, etc.) with items from the order picker 100A, and the other mobile robot is carrying an empty cargo holder to be transferred to the order picker 100A). In other words, mobile robots essentially come and go constantly from the parking lane 310, transporting receptacles (empty receptacles or receptacles that include picked items). In this manner, the time spent by the worker 14 transporting receptacles is minimized, if not eliminated, and the time spent by the worker 14 picking items is maximized.

The preferred embodiment of the system described throughout this disclosure includes installing the elevated pathway in an existing rack system at the end of the rack system's rows. The elevated pathway can therefore replace one or more rows of storage. The elevated pathway can be added through the existing rack system, at one or more elevations. As a result, human operated vehicles or other warehouse vehicles can still move on the warehouse floor and pass below the elevated pathway without any obstructions or interference. In yet other embodiments, an end of each aisle can be blocked by the elevated pathway, so long as the human operated vehicles or other warehouse vehicles can exit through another or opposite end of each aisle.

Additional Optional Features and Embodiments

In some alternative embodiments (not shown) an elevated pathway can be at least partially integrated into a middle portion of the storage system, transverse to the rack aisles. In some such embodiments, the elevated pathway can have four lanes (e.g., two outer lanes on opposing sides for parking lanes and two inner lanes for transport lanes with travel in one or both directions). As a result, an order picker on either side of the elevated pathway can pick up cargo holders or other receptacles that are delivered on mobile robots parked in the parking lanes on either side of the elevated pathway.

In yet other examples, the elevated pathway can have three lanes or fewer, wherein two outer lanes on opposing sides of the elevated pathway can be parking lanes and an inner lane can the transport lane with travel in one direction. In some examples, each transport lane can be in a different direction, such that there is two-way travel of mobile robots on the elevated pathway. This can increase overall efficiency and reduce time spent in transporting cargo holders throughout the warehouse environment.

In another variation of the processes described above, order picking and inventory stowage can be combined into a highly efficient continuous-flow process as follows. First, order picking can take place as depicted in FIGS. 3-5 (e.g., the worker 14 can place ordered items from the storage racks/shelves into the order picker cage 330). However (in reference to FIGS. 4-6), after the order picker 100A has transferred the sufficiently-filled order picker cage 330 back to the first mobile robot 360A, the pallet 350 transported to the order picker 100A by the third mobile robot 360B can include one or more items to be stowed into inventory (rather than being empty). The worker 14 can then stow the items on the pallet 350 into proper storage locations in the designated aisle. When that stowing process has been completed, such that the pallet 350 is empty but still engaged with the order picker 100A, the worker 14 can begin another order picking process. That is, the worker 14 can begin to place ordered items from the storage racks/shelves onto the emptied pallet 350. The third mobile robot 360B can wait in one of the parking spots in the parking lane 310 while the worker 14 completes this order picking and inventory storage process.

After the order picker 100A transferred the sufficiently-filled pallet 350 back to the third mobile robot 360B, the third mobile robot 360B can move into the transport lane 210 and transport the filled pallet 350 to one or more locations in the warehouse. Then, another receptacle holding one or more items to be stowed into the storage system can be transported to the order picker 100A by a mobile robot that arrives and/or has been waiting in a parking spot in the parking lane 310. This combined process of picking, stowing, picking, stowing, and so on, can be cyclically repeated as however desired, and very little unproductive time by the worker 14 will be incurred.

It should be also understood that in some cases, the sequence of picking and stowing can be adjusted to optimally suit the needs of warehouse operation at that time. For example, an optimized combined process may sequentially be: picking, stowing, stowing, picking, picking, stowing, picking and whatever process (picking or stowing) makes the most sense based on real-time, ongoing dynamic needs of the operation.

In yet another variation of the processes described above, a cargo holder that is used for receiving picked items can remain on a mobile robot that is parked in the parking lane in the elevated pathway while the worker operating the order picker is picking items from multiple elevations of the racks/shelves (rather than the order picker holding onto the cargo holder as the worker picks items). In this arrangement, as the worker picks items, the worker can transport the items (e.g., one at a time or in batch) to the cargo holder on the mobile robot. When the cargo holder receiving the ordered items is sufficiently filled, the mobile robot can automatically move from the parking lane to the transport lane and then transport the cargo holder to the next appropriate warehouse location. Then, another mobile robot can take the previous mobile robot's place in the parking lane with an empty cargo holder and wait to receive picked items from the worker on the order picker in the designated aisle.

In some embodiments, the mobile robots can transport via the transport lane of the elevated pathway the picked items to an order sortation process after the picking. The mobile robots can also transport the picked items and/or empty/filled cargo holders to different levels of a rack storage system. This arrangement uses a vertical transport for transferring the mobile robots between the different levels of the rack storage system. The vertical transport can be various types of mechanisms (e.g., an elevator, vertical conveyor, telescoping arm, chute, slide, etc.) that is attached to a portion of the elevated pathway. This feature can reduce the amount of time it would take the worker to pick items in a designated aisle because the worker would not be required to adjust a height of the order picker based on the rack level that the worker must pick from. This feature would also increase productivity and throughput because cargo holders can be transported throughout the warehouse without causing collisions or traffic on the warehouse floor.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described herein should not be understood as requiring such separation in all embodiments, and it should be understood that the described program components and systems can generally be integrated together in a single product or packaged into multiple products.

What is claimed is:

1. A material handling system, comprising:
a rack storage system in a warehouse;

an elevated pathway at least partially integrated into the rack storage system at a level of elevation above a floor of the warehouse, wherein the elevated pathway comprises two lanes for mobile robots;
a first mobile robot configured to transport a cargo holder on the elevated pathway; and
a second mobile robot configured to transport the cargo holder on the elevated pathway,
wherein the cargo holder remains on the first or second mobile robot that is parked in a mobile robot parking spot in a parking lane of the two lanes of the elevated pathway while an order picker transports items from one or more storage locations in the rack storage system to the cargo holder on the mobile robot.

2. The system of claim 1, wherein one of the two lanes is a parking lane defining a plurality of mobile robot parking spots, wherein at least one of the plurality of mobile robot parking spots is associated with each aisle in the warehouse.

3. The system of claim 2, wherein one of the two lanes is a transport lane configured to allow the first and second mobile robots to travel along the elevated pathway, wherein the first mobile robot is configured to:
move into a first mobile robot parking spot in the parking lane;
receive a first cargo holder from an order picker in the first mobile robot parking spot in the parking lane;
move, in response to receiving the first cargo holder from the order picker, into the transport lane of the elevated pathway; and
transport the first cargo holder to one or more remote locations in the warehouse via the transport lane of the elevated pathway.

4. The system of claim 1, wherein the elevated pathway is at least partially integrated into an end of the rack storage system.

5. The system of claim 1, wherein the elevated pathway comprises a third lane for mobile robots, wherein the third lane is another transport lane configured to allow the first and second mobile robots to travel along the elevated pathway.

6. The system of claim 1, wherein the elevated pathway is at least partially integrated into a middle of the rack storage system.

7. The system of claim 6, wherein the elevated pathway comprises three lanes for mobile robots, wherein two of the three lanes are parking lanes on opposing sides of the elevated pathway and one of the three lanes is a first transport lane positioned between the parking lanes.

8. The system of claim 7, wherein the elevated pathway further comprises a fourth lane for mobile robots defining a second transport lane, wherein the second transport lane is positioned between the parking lanes.

9. The system of claim 1, further comprising one or more elevated pathways at least partially integrated into the rack storage system at multiple levels of elevation above the floor of the warehouse.

10. The system of claim 3, wherein the second mobile robot is configured to move into a second mobile robot parking spot in the parking lane with a second cargo holder, such that the second cargo holder can be transferred to the order picker for picking.

11. The system of claim 10, wherein the second cargo holder is filled with items for stowing and the second mobile robot is further configured to:
move into the second mobile robot parking spot in the parking lane with the second cargo holder, such that the second cargo holder can be transferred to the order picker for stowing and then picking;
receive, from the order picker, the second cargo holder that is filled with items from picking by the order picker;
move, in response to receiving the second cargo holder from the order picker, into the transport lane of the elevated pathway; and
transport the second cargo holder to one or more remote locations in the warehouse via the transport lane of the elevated pathway.

12. The system of claim 1, wherein the cargo holder is a cage.

13. The system of claim 1, wherein the cargo holder is a pallet.

14. A method of material handling, the method comprising:
controlling a first mobile robot to park in a first mobile robot parking spot in a parking lane of an elevated pathway that is integrated into a rack storage system at a level of elevation above a floor of a warehouse, the first mobile robot being configured to receive a first cargo holder from an order picker, wherein the first cargo holder is configured for receiving items being picked from storage;
controlling a second mobile robot to park in a second mobile robot parking spot in the parking lane of the elevated pathway, wherein the second mobile robot is transporting a second cargo holder;
controlling, after receiving the first cargo holder from the order picker, the first mobile robot to move into a transport lane of the elevated pathway; and
controlling the first mobile robot to transport the first cargo holder received from the order picker to one or more remote locations in the warehouse via the transport lane of the elevated pathway.

15. The method of claim 14, further comprising controlling the second mobile robot to move from the second mobile robot parking spot into the first mobile robot parking spot such that the second cargo holder can be transferred to the order picker.

16. The method of claim 14, further comprising:
controlling the second mobile robot to park in the first mobile robot parking spot, the second mobile robot being configured to receive the second cargo holder from the order picker, wherein the second cargo holder is configured for receiving items being picked from storage;
controlling a third mobile robot to park in the second mobile robot parking spot in the parking lane of the elevated pathway, wherein the third mobile robot is transporting a third cargo holder;
controlling, after receiving the first cargo holder from the order picker, the second mobile robot to move into the transport lane of the elevated pathway;
controlling the second mobile robot to transport the second cargo holder received from the order picker to one or more remote locations in the warehouse via the transport lane of the elevated pathway; and
controlling the third mobile robot to move from the second mobile robot parking spot into the first mobile robot parking spot such that the third cargo holder can be transferred to the order picker.

17. A method of picking ordered items and stowing replenishment items, the method comprising:
a) transferring, by a worker operating an order picker, one or more first ordered items from first storage locations and putting the one or more first ordered items in or on a first cargo holder that is engaged with the order picker;

b) transferring, from the order picker to a first mobile robot that is parked in a first mobile robot parking spot in a parking lane of an elevated pathway that is integrated into a rack storage system at a level of elevation above a floor of a warehouse, the first cargo holder with the one or more first ordered items in or on it such that the first mobile robot can move into a transport lane of the elevated pathway and transport the first cargo holder with the one or more first ordered items in or on it to one or more remote locations in the warehouse;

c) after the transferring of the first cargo holder with the one or more first ordered items in or on it to the first mobile robot, transferring, from a second mobile robot that is parked in a second mobile robot parking spot in the parking lane of the elevated pathway, a second cargo holder with one or more replenishment items in or on it such that the second cargo holder with the one or more replenishment items in or on it becomes engaged with the order picker;

d) transferring, by the worker operating the order picker, the one or more replenishment items from the second cargo holder that is engaged with the order picker into storage locations; and e) after the transferring of the one or more replenishment items into the storage locations, transferring, by the worker operating the order picker, one or more second ordered items from second storage locations and putting the one or more second ordered items in or on the second cargo holder that is engaged with the order picker.

18. The method of claim 17, further comprising:

f) transferring, from the order picker to the second mobile robot, the second cargo holder with the one or more second ordered items in or on it such that the second mobile robot can move into the transport lane of the elevated pathway and transport the second cargo holder with the one or more second ordered items in or on it to one or more remote locations in the warehouse.

19. A material handling system, comprising:

a rack storage system in a warehouse;

an elevated pathway at least partially integrated into the rack storage system at a level of elevation above a floor of the warehouse, wherein the elevated pathway comprises two lanes for mobile robots;

a first mobile robot configured to transport a cargo holder on the elevated pathway; and a second mobile robot configured to transport the cargo holder on the elevated pathway, wherein one of the two lanes is a parking lane defining a plurality of mobile robot parking spots, wherein at least one of the plurality of mobile robot parking spots is associated with each aisle in the warehouse.

20. The material handling system of claim 19, wherein one of the two lanes is a transport lane configured to allow the first and second mobile robots to travel along the elevated pathway, wherein the first mobile robot is configured to:

move into a first mobile robot parking spot in the parking lane;

receive a first cargo holder from an order picker in the first mobile robot parking spot in the parking lane;

move, in response to receiving the first cargo holder from the order picker, into the transport lane of the elevated pathway; and transport the first cargo holder to one or more remote locations in the warehouse via the transport lane of the elevated pathway.

* * * * *